United States Patent
Schüle et al.

(10) Patent No.: US 9,347,413 B2
(45) Date of Patent: May 24, 2016

(54) METHOD AND CONTROL UNIT FOR CONTROLLING AN INTERNAL COMBUSTION ENGINE

(75) Inventors: Harry Schüle, Neunburg V. Wald (DE); Markus Stutika, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 358 days.

(21) Appl. No.: 13/810,260

(22) PCT Filed: Jul. 6, 2011

(86) PCT No.: PCT/EP2011/061413
§ 371 (c)(1),
(2), (4) Date: Mar. 29, 2013

(87) PCT Pub. No.: WO2012/007336
PCT Pub. Date: Jan. 19, 2012

(65) Prior Publication Data
US 2013/0180505 A1    Jul. 18, 2013

(30) Foreign Application Priority Data
Jul. 15, 2010  (DE) .......................... 10 2010 027 213

(51) Int. Cl.
F02M 63/00    (2006.01)
F01L 13/00    (2006.01)
(Continued)

(52) U.S. Cl.
CPC ............ *F02M 63/00* (2013.01); *F01L 13/0015* (2013.01); *F02D 13/0207* (2013.01);
(Continued)

(58) Field of Classification Search
CPC .................... F02D 41/3094; F02D 2200/0602; F02D 19/025; F02D 19/027; F02D 19/061; F02D 13/0203; F02D 13/0207; F02D 41/008; F02D 41/1465; F02D 41/1497; F02D 41/345; F02D 41/401; F02D 7/00

USPC .................... 123/444, 445, 457; 701/102–105
See application file for complete search history.

(56) References Cited

U.S. PATENT DOCUMENTS

| | | | |
|---|---|---|---|
| 4,960,094 A | 10/1990 | Koike et al. | 123/406.13 |
| 4,960,095 A | 10/1990 | Koike et al. | 123/406.35 |

(Continued)

FOREIGN PATENT DOCUMENTS

| | | | |
|---|---|---|---|
| DE | 4036847 A1 | 5/1991 | F02D 13/02 |
| DE | 19741820 A1 | 3/1999 | F01L 1/34 |

(Continued)

OTHER PUBLICATIONS

German Office Action, Application No. 10 2010 027 215.9, 3 pages, Apr. 7, 2011.

(Continued)

*Primary Examiner* — Lindsay Low
*Assistant Examiner* — Long T Tran
(74) *Attorney, Agent, or Firm* — Slayden Grubert Beard PLLC (57) ABSTRACT

A method and a control unit are disclosed for controlling an internal combustion engine having fuel injector(s), a camshaft for actuating inlet and/or outlet valve(s), a valve-train adjusting device for controllably changing the actuating characteristic of at least one valve which is actuated by means of the camshaft, and optionally having a camshaft sensor which supplies a camshaft signal dependent on the camshaft angle, a crankshaft sensor which supplies a crankshaft signal representing the crankshaft angle, and a control unit for controlling the fuel injection and the valve-train adjusting device. In order to obtain information about the current setting of the valve-train adjusting device, at least one cylinder pressure signal supplied by a cylinder pressure sensor for measuring the pressure in an associated cylinder is evaluated with regard to interference signals, and the evaluation result is taken into consideration in the control of the valve-train adjusting device.

17 Claims, 3 Drawing Sheets

(51) Int. Cl.

| | | |
|---|---|---|
| *F02D 13/02* | (2006.01) | |
| *F02D 35/02* | (2006.01) | |
| *F02D 41/00* | (2006.01) | |
| F02D 41/22 | (2006.01) | |
| F02D 41/28 | (2006.01) | |

(52) U.S. Cl.
CPC .......... *F02D35/023* (2013.01); *F02D 41/0002* (2013.01); *F01L 2800/00* (2013.01); *F02D 41/009* (2013.01); *F02D 41/221* (2013.01); *F02D 2041/001* (2013.01); *F02D 2041/286* (2013.01); *Y02T 10/18* (2013.01); *Y02T 10/42* (2013.01)

(56) References Cited

U.S. PATENT DOCUMENTS

| | | | | |
|---|---|---|---|---|
| 4,995,351 | A | 2/1991 | Ohkubo et al. | 123/90.11 |
| 5,179,857 | A | 1/1993 | Sonderegger et al. | 73/114.07 |
| 5,485,822 | A | 1/1996 | Hirose et al. | 123/501 |
| 5,555,870 | A | 9/1996 | Asano | 123/480 |
| 5,586,524 | A | 12/1996 | Nonaka et al. | 123/73 A |
| 6,109,225 | A * | 8/2000 | Ogita et al. | 123/90.15 |
| 6,276,319 | B2 | 8/2001 | Walter et al. | 123/90.15 |
| 6,564,785 | B2 * | 5/2003 | Iwasaki | 123/568.21 |
| 6,581,557 | B1 * | 6/2003 | Gaessler et al. | 123/90.15 |
| 6,650,994 | B2 | 11/2003 | Mühlberger et al. | 701/114 |
| 6,659,054 | B2 | 12/2003 | Sugiyama et al. | 123/90.16 |
| 6,691,653 | B2 | 2/2004 | Denz | 123/90.15 |
| 6,880,531 | B2 | 4/2005 | Bayerle et al. | 123/490 |
| 7,398,749 | B2 | 7/2008 | Weiss et al. | 123/90.16 |
| 7,438,046 | B2 | 10/2008 | Okubo et al. | 123/321 |
| 7,689,344 | B2 | 3/2010 | Kang et al. | 701/103 |
| 7,904,231 | B2 | 3/2011 | Haskara et al. | 701/103 |
| 7,930,093 | B2 | 4/2011 | Bauer et al. | 701/114 |
| 2003/0106531 | A1 | 6/2003 | Saeki et al. | 123/435 |
| 2004/0050363 | A1 | 3/2004 | Yamaoka et al. | 123/435 |
| 2004/0139949 | A1 | 7/2004 | Koseki et al. | 123/568.14 |
| 2004/0194754 | A1 | 10/2004 | Yamaoka et al. | 123/295 |
| 2006/0169243 | A1 | 8/2006 | Neunteufl et al. | 123/295 |
| 2006/0287806 | A1 * | 12/2006 | Hori | 701/114 |
| 2007/0137619 | A1 | 6/2007 | Fader et al. | 123/435 |
| 2007/0239343 | A1 * | 10/2007 | Okubo et al. | 701/105 |
| 2007/0246004 | A1 | 10/2007 | Matekunas et al. | 123/299 |
| 2008/0077304 | A1 * | 3/2008 | Suzuki et al. | 701/102 |
| 2009/0084333 | A1 * | 4/2009 | Cleary et al. | 123/90.17 |
| 2009/0198474 | A1 | 8/2009 | Fritz et al. | 702/183 |
| 2009/0228190 | A1 | 9/2009 | Loeffler et al. | 701/103 |
| 2010/0023240 | A1 | 1/2010 | Haskara et al. | 701/103 |
| 2010/0318280 | A1 * | 12/2010 | Moriya et al. | 701/103 |
| 2011/0224886 | A1 | 9/2011 | Wang et al. | 701/103 |
| 2011/0301828 | A1 * | 12/2011 | Moriya et al. | 701/105 |
| 2013/0180505 | A1 | 7/2013 | Schüle et al. | 123/445 |
| 2013/0180506 | A1 | 7/2013 | Schüle et al. | 123/472 |
| 2013/0338906 | A1 | 12/2013 | Akazaki et al. | |

FOREIGN PATENT DOCUMENTS

| | | | | |
|---|---|---|---|---|
| DE | 10056862 | C1 | 5/2002 | F02D 41/04 |
| DE | 10064650 | A1 | 7/2002 | F01L 1/00 |
| DE | 10356257 | A1 | 7/2005 | F01L 13/00 |
| DE | 10028995 | B4 | 10/2005 | F01L 1/34 |
| DE | 102004023589 | A1 | 1/2006 | F02D 13/00 |
| DE | 102005062558 | A1 | 6/2007 | F01L 9/02 |
| DE | 102006062038 | A1 | 7/2007 | F02D 13/02 |
| DE | 102006061566 | A1 | 7/2008 | F02D 41/00 |
| DE | 102008004442 | B3 | 7/2009 | F02D 41/00 |
| DE | 112008001529 | T5 | 4/2010 | F01L 1/34 |
| EP | 0459946 | A1 | 12/1991 | F02B 77/08 |
| EP | 1338778 | A1 | 8/2003 | F01L 13/00 |
| WO | 2004/048761 | A1 | 6/2004 | F01L 9/04 |
| WO | 2012/007307 | A1 | 1/2012 | F02D 41/06 |
| WO | 2012/007323 | A1 | 1/2012 | F02D 13/02 |
| WO | 2012/007336 | A1 | 1/2012 | F01L 13/00 |

OTHER PUBLICATIONS

German Office Action, Application No. 10 2010 027 213.2, 3 pages, Apr. 8, 2011.
German Office Action, Application No. 10 2010 027 214.0, 3 pages, Apr. 11, 2011.
International Search Report and Written Opinion, Application No. PCT/EP2011/061331, 16 pages, Oct. 4, 2011.
International Search Report and Written Opinion, Application No. PCT/EP2011/061230, 15 pages, Oct. 4, 2011.
International Search Report and Written Opinion, Application No. PCT/EP2011/061413, 16 pages, Oct. 14, 2011.
German Office Action, Application No. 10 2010 027 215.9, 4 pages, Jan. 24, 2013.
German Office Action, Application No. 10 2010 027 214.0, 4 pages, Jan. 24, 2013.
U.S. Final Office Action, U.S. Appl. No. 13/810,235, 23 pages, Oct. 27, 2015.
U.S. Notice of Allowance, U.S. Appl. No. 13/810,235, 9 pages.

* cited by examiner

METHOD AND CONTROL UNIT FOR CONTROLLING AN INTERNAL COMBUSTION ENGINE

CROSS-REFERENCE TO RELATED APPLICATIONS

This application is a U.S. National Stage Application of International Application No. PCT/EP2011/061413 filed Jul. 6, 2011, which designates the United States of America, and claims priority to DE Application No. 10 2010 027 213.2 filed Jul. 15, 2010, the contents of which are hereby incorporated by reference in their entirety.

TECHNICAL FIELD

The present disclosure relates to a method and a control unit for controlling an internal combustion engine.

For example, the disclosure relates to the control of an applied-ignition or diesel engine which is used as a drive source in a conventional motor vehicle or as one of multiple drive sources in a hybrid vehicle.

The valve drive adjustment device used in the case of such control for controllable change of the actuation characteristic ("lift curve") of at least one valve (inlet valve or outlet valve) which is actuated by means of a camshaft advantageously permits a reduction in fuel consumption and/or an increase in power in relation to internal combustion engines without a valve drive adjustment device.

BACKGROUND

Valve drive adjustment devices controlled by an electronic engine control unit in a motor vehicle are known in a variety of applications. Three are mentioned here by way of example. In the case of the "Valvetronic" adjustment device (BMW), an actuating mechanism arranged between a camshaft and a valve tappet is adjusted by means of an electric actuating motor and an eccentric shaft in order to realize a variable (maximum) valve lift as a function of certain operating parameters of the internal combustion engine. Said adjustment of the valve lift may be combined with a so-called camshaft phase adjustment in which a relative adjustment of the crankshaft and camshaft with respect to one another, and thus a variation of the valve timing, is also performed as a function of the operating state of the internal combustion engine. An electronically controlled change of the valve actuation characteristic by means of an engine control unit is likewise provided in the case of the "VTEC" (Honda) adjustment device. Said system exists in different variants which however have in common the fact that a switch between different actuation characteristics takes place as a function of certain parameters of engine operation. In the "Ti-VCT" (Ford) adjustment device, adjustment by means of hydraulic actuators is provided. The adjustment is performed in a continuously variable fashion as a function of engine load by means of electronic characteristic-map-based control.

The known valve drive adjustment devices may furthermore be divided roughly into two categories with regard to variability of adjustment, specifically discontinuously variable systems and continuously variable systems.

A discontinuously variable system may for example be constructed such that a plurality of different profiles per valve is provided on the camshaft. Each profile results in a different lift curve for the valve, wherein at all times only one profile can be active, and switching between the different profiles can be performed. In concepts of said type, a change in the lift curve is performed abruptly.

In relation thereto, continuously variable systems offer more comprehensive variability of the valve drive. Since said systems permit a continuous variation of the valve actuation characteristic, they thus eliminate for example the difficulties that otherwise result from an abrupt switch. Continuous systems are used in particular for low-loss load control of internal combustion engines. It is for example possible for the air or mixture supply to the combustion chamber to be controlled by means of the variability of the lift curve of an inlet valve.

In particular in the case of continuously variable systems which are controlled by means of an electronic control unit, the most precise possible knowledge of the present valve lift or of the present setting of the system is necessary in order to permit correct and fast control or regulation of the system and thus optimally control the combustion. In the case of known valve drive adjustment devices, therefore, a position sensor (for example rotary angle transducer etc.) is provided which outputs to the control unit a position sensor signal which represents the present position (setting) of the adjustment device.

Such a position sensor signal is then taken as an input variable in the control, in particular for example regulation, of the valve drive adjustment device by the electronic engine control unit.

The arrangement of a position sensor on the valve drive adjustment device however disadvantageously entails a certain amount of outlay in terms of construction, in particular if it is sought for the sensor signal output by said position sensor to represent the actual present setting with high accuracy.

SUMMARY

One embodiment provides a method for controlling a single-cylinder or multi-cylinder internal combustion engine having at least one fuel injector per cylinder for injecting fuel, at least one camshaft for actuating at least one inlet valve and/or at least one outlet valve, wherein a valve drive adjustment device is provided for controllable change of the actuation characteristic of at least one valve that is actuated by means of the camshaft, a crankshaft sensor which outputs a crankshaft signal which represents the crankshaft angle, and a control unit for controlling the fuel injection and the valve drive adjustment device, wherein at least one cylinder pressure signal output by a cylinder pressure sensor for measuring the pressure in an associated cylinder is evaluated with regard to interference signals, and in that the evaluation result is taken into consideration as an input variable in the control of the valve drive adjustment device.

In a further embodiment, the change of the actuation characteristic of the respective valve encompasses a valve lift adjustment and the evaluation result is taken into consideration as an input variable in the control of the valve lift adjustment.

In a further embodiment, the change of the actuation characteristic of the respective valve encompasses a camshaft phase adjustment and the evaluation result is taken into consideration as an input variable in the control of the camshaft phase adjustment.

In a further embodiment, the change of the actuation characteristic of the respective valve takes place in continuous fashion.

In a further embodiment, for the control of the valve drive adjustment device, a present setting of the valve drive adjustment device is determined by virtue of a certain time or crank angle, detected on the basis of the evaluation result, of a certain event of a valve actuation process being set in relation to a time or crank angle, detected on the basis of a camshaft signal output by a camshaft sensor, of another certain event of the same valve actuation process.

In a further embodiment, the evaluation result is furthermore used for checking the plausibility of the crankshaft signal output by the crankshaft sensor and/or of the camshaft signal output by the camshaft sensor.

In a further embodiment, the internal combustion engine has a plurality of cylinders and the cylinder pressure signals of cylinder pressure sensors respectively assigned to all of the cylinders are taken into consideration.

Another embodiment provides a control unit for controlling a single-cylinder or multi-cylinder internal combustion engine having at least one fuel injector per cylinder for injecting fuel, at least one camshaft for actuating at least one inlet valve and/or at least one outlet valve, wherein a valve drive adjustment device is provided for controllable change of the actuation characteristic of at least one valve that is actuated by means of the camshaft, a crankshaft sensor which outputs a crankshaft signal which represents the crankshaft angle, and the control unit for controlling the fuel injection and the valve drive adjustment device, wherein the control unit is designed to evaluate with regard to interference signals at least one cylinder pressure signal output by a cylinder pressure sensor for measuring the pressure in an associated cylinder, and to take the evaluation result into consideration as an input variable in the control of the valve drive adjustment device.

BRIEF DESCRIPTION OF THE DRAWINGS

Exemplary embodiments will be explained in more detail below based on the schematic drawings, wherein.

DETAILED DESCRIPTION

Embodiments of the present disclosure may simplify the obtaining of information regarding the present setting of the valve drive adjustment device, e.g., to thereby permit rapid and precise regulation of the valve drive adjustment device.

In some embodiments, at least one cylinder pressure signal output by a cylinder pressure sensor for measuring the pressure in an associated cylinder is evaluated with regard to interference signals, and in that the evaluation result is taken into consideration as an input variable in the control of the valve drive adjustment device.

Said evaluation result can itself be used as a "sensor signal" which represents the present setting of the valve drive adjustment device. Alternatively, said evaluation result may however also be supplied to the control unit in addition to a position sensor signal of conventional type, either for example in order to realize redundancy in the determination of the present setting or for example to realize an improvement in the accuracy of said determination. A further advantage consists in that the evaluation result can furthermore be used for performing a diagnosis with regard to correct functioning of the valve drive adjustment. If for example an adjustment is triggered by means of the control unit but the evaluation result does not reflect a correct actual adjustment, a fault is present, upon the detection of which a suitable warning can be generated and/or an entry can be made in a diagnostic memory.

Cylinder pressure sensors are known per se in the field of engine technology and serve for measuring the cylinder pressure. In conventional systems, the cylinder pressure signal is used only for evaluating the combustion. It is thus possible, for example, for errors in the metering of the fuel, of the air mass or of a recirculated combustion gas fraction to be determined and/or corrected. In the case of a multi-cylinder internal combustion engine, it is the case in conventional systems that for this purpose either only a single cylinder pressure sensor at one of the cylinders is taken into consideration as a representative of all of the cylinders collectively, or alternatively a separate cylinder pressure sensor is provided for each cylinder.

Such cylinder pressure sensors normally have such high sensitivity and/or such a high resolution for the measurement of the cylinder pressure that they are also sensitive to interference noises which propagate (as body-borne sound) through a for example metallic cylinder block. The basic concept is for the interference signals, caused by such interference noises, in one or more cylinder pressure signals detected by one or more cylinder pressure sensors to be utilized as a source of information regarding the engine state, in particular the state of the valve drive adjustment device. If one or more camshafts rotate in order thereby to realize the valve drive (opening and closing of inlet and outlet valves), noises are generated which lead to characteristic interference signals in the one or more cylinder pressure signals. By means of the disclosed evaluation of the (at least one) cylinder pressure signal with regard to such disturbance signals, it is thus advantageously possible to draw conclusions regarding the present setting. This is achieved for example through the use of suitably predetermined evaluation criteria, on the basis of which, in the engine control unit, an identification of processes in the valve drive takes place, and subsequent determination of the present setting on the basis of the previously identified processes in the valve drive.

One possible identification criterion may for example consist in detecting sudden changes, for example discontinuities or "signal peaks" in the measured pressure profile, and assigning them on the basis of the characteristic thereof (for example amplitude, frequency components, duration etc.) and/or on the basis of additional information regarding the engine position (for example crankshaft signal, camshaft signal etc.) to a very particular process in the valve drive (for example valve opening or valve closing process). Such an approach is significantly easier, faster and often more precise than for example an evaluation on the basis of a comparison of the measured pressure profile (cylinder pressure signal) with previously stored typical pressure profiles.

In particular, the evaluation may encompass an identification of times and/or crank angles at which inlet valves and/or outlet valves are opened or closed. For said evaluation step, it is for example possible for interference signals caused by the relevant valves upon the actuation thereof to be detected.

An interference signal which occurs in particularly pronounced form in practice and which is thus relatively easy to detect by evaluation arises for example at the end of a closing process of a valve (inlet or outlet valve). The setting down, which occurs at that time, of a valve body (for example a valve plate) onto a sealing surface in the region of a wall which delimits the associated cylinder leads to a mechanical vibration which manifests itself very clearly as an interference signal (for example "signal peak") in the actual useful signal (representative of the cylinder pressure).

In the case of a multi-cylinder internal combustion engine, it may be preferable, in particular with regard to a simple and reliable identification of the valve which has generated a certain interference signal, for the cylinder pressure signals of cylinder pressure sensors respectively assigned to all of the cylinders to be evaluated. For this purpose, each cylinder must be provided with at least one cylinder pressure sensor, which may be installed for example in the region of a respective cylinder head.

It is basically possible for the noises of the opening and of the closing of the inlet valve and also of the outlet valve to be detected by means of one cylinder pressure sensor and suitable evaluation of the cylinder pressure signals output thereby. For the determination of the present setting of the valve drive adjustment device during engine operation, it is accordingly possible to take into consideration in particular the times of interference signals generated by an opening or a closing of an inlet valve or of an outlet valve. The respective magnitude of the interference signals generated thereby is dependent for example on the specifically selected installation position of the sensor. By means of corresponding installation of the cylinder pressure sensor, for example closer to an inlet valve than to an outlet valve of the respective cylinder, it is possible for interference signals firstly of the inlet valve and secondly of the outlet valve to be generated which can be distinguished from one another qualitatively and/or quantitatively within the context of the evaluation, such that it is advantageously possible for the valve that is generating a certain interference signal to be identified in a simple manner (for example on the basis of the interference signal amplitude).

If the evaluation result taken into consideration as an input variable for the control of the valve drive adjustment device concerns the times or crank angles at which a certain valve opening process begins or valve closing process ends, it is possible in the control unit for a determination of the present setting of the adjustment device to be realized for example in that, on the basis of a predetermined algorithm (for example by means of a characteristic map or the like stored in the control unit), conclusions are drawn regarding the profile of the valve actuation process as a whole ("lift curve"). The information regarding the profile of the lift curve (for example as a function of the crank angle) is however equivalent to information regarding the present setting of the adjustment device.

A prerequisite for the functioning of said method of determining the present setting may be a predefined relationship between the valve timing (for example the times and/or crank angles at which a valve opening process begins or a valve closing process ends) and/or the valve opening duration on the one hand and the present setting of the valve drive adjustment device on the other hand.

Said prerequisite is fulfilled for example when the variable setting is represented by a set of lift curves which do not intersect in a plot of the valve lift versus the crank angle. In this case, different valve timings yield different lift curves, such that, taking into consideration the specific mode of operation of the valve drive adjustment device, it is possible with the knowledge of said valve timing to infer the then uniquely associated lift curves. The latter inference may be performed for example using suitable evaluation software in the control unit, by means of which the previous determination of the valve timing is also performed.

It may thus be possible to obtain information regarding the present setting of said adjustment device independently of a position sensor which is if appropriate provided in the region of the valve drive adjustment device. It is thus possible in particular to dispense with a position sensor provided specifically for this purpose. The "incorrect use" of at least one cylinder pressure sensor within the context of this disclosure does not in any way rule out that the one or more cylinder pressure signals gained are also used in the "conventional way", that is to say for assessing the combustion quality in engine operation.

In one embodiment, it is provided that the change of the actuation characteristic of the respective valve encompasses a valve lift adjustment and the evaluation result is taken into consideration as an input variable in the control of the valve lift adjustment. This means that the valve drive adjustment device can be actuated so as to attain different maximum valve strokes.

It may alternatively or additionally be provided that the change of the actuation characteristic of the respective valve encompasses a camshaft phase adjustment and the evaluation result is taken into consideration as an input variable in the control of the camshaft phase adjustment. This means, in a broader sense, that the valve drive adjustment device can be actuated so as to change the valve timing of the respective valve. In a narrower sense, the "camshaft phase adjustment" may refer to the relative rotation, which is suitable for this purpose, between the camshaft and the crankshaft.

In one embodiment which combines the abovementioned options, the change of the actuation characteristic encompasses both a valve lift adjustment and also a cam phase adjustment (that is to say a change in the timing) of the respective valve.

In one embodiment, the change of the actuation characteristic of the respective valve takes place in continuously variable fashion.

In conventional internal combustion engines, a camshaft sensor is provided which outputs a camshaft signal which is dependent on the camshaft angle. In this regard, however, it is necessary to point out the possibility, which is conceivable in principle within the context of this disclosure, of dispensing with the use of a camshaft sensor, and of the camshaft signal output thereby, in the determination of the camshaft angle. It is in principle conceivable to use for this purpose the evaluation result regarding the interference signals of the cylinder pressure signal.

In an embodiment in which a camshaft sensor is provided, it is possible, for the control of the valve drive adjustment device, for a present setting of the valve drive adjustment device to be determined for example by virtue of a time or crank angle, detected on the basis of the evaluation result, of a certain event of a valve actuation process being set in relation to a time or crank angle, detected on the basis of the camshaft signal, of another certain event of the same valve actuation process.

The time detected on the basis of the evaluation result may in particular be the time (synonymous with crank angle) at which a certain valve closes (setting-down of a valve body on a valve sealing surface). Said time may for example be set in relation to the time or crankshaft angle, determined on the basis of the camshaft signal (usually jointly taking into consideration the crankshaft signal), at which the valve lift maximum was previously reached. From said two times and/or crank angles, it is then possible by simple difference calculation to determine (calculate) the time period or crank angle difference between the lift maximum and the termination of the valve closing process. From said difference, it is then possible, again using a suitable software algorithm or previously stored characteristic map, to infer the present setting of the valve drive adjustment device.

As already mentioned above, said method for determining the present setting functions for example when the variability of the valve drive adjustment device is represented by a non-intersecting set of valve lift curves. In this case, there are always different time or crank angle differences between the lift maximum and the termination of the valve actuation (complete closure of the respective valve) for different lift curves.

Said method of also determining the associated lift curve or setting on the basis of a determination of a valve closing time is however also possible for example when the adjustment of the adjustment device is associated with a change not of the valve closing time but rather only of the (maximum) valve stroke. Specifically, in this case, the interference noise resulting from the setting-down of the valve body (for example valve plate) onto the respective valve sealing surface (for example inlet opening on a cylinder head) will generally vary as a function of the previously attained valve lift. This is the case for example owing to a speed with which the valve body impacts against the sealing surface, said speed being dependent on the maximum valve stroke reached previously. Since such differences in the generated noise or body-borne sound can however be detected in the evaluation of the cylinder pressure signal, it is possible in this case, too, to draw corresponding conclusions regarding the maximum valve stroke reached previously and thus the setting of the valve drive adjustment device.

As already mentioned, it is conceivable within the context of this disclosure to dispense with a camshaft sensor provided for determining the camshaft angle. However, if a camshaft sensor of said type is provided, then the determination of the camshaft angle as performed by the control unit may advantageously be realized within the context of this disclosure for example additionally taking into consideration the evaluation of the cylinder pressure signal.

The information regarding whether and how fast the crankshaft is rotating is gained, in known engines, on the basis of the crankshaft signal. Said crankshaft signal is normally a "toothed signal": each pulse of the crankshaft signal corresponds to a tooth of an encoder wheel which is provided with a multiplicity of teeth. A synchronization pulse provided for in each case one crankshaft revolution (360°) normally corresponds to a single or double "tooth space" after the corresponding number of teeth.

The camshaft signal serves for encoding the camshaft angle and, in the simplest case, has two different levels which are assigned to two successive revolutions of the camshaft. The camshaft signal may however also have other signal or pulse shapes. It should however be ensured that the camshaft signal permits a division of each working cycle of the engine into two segments (of in each case 360°) corresponding to two successive crankshaft revolutions (720°).

Such crankshaft signals and camshaft signals which are known per se may advantageously also be provided within the context of this disclosure (cf. for example DE 100 56 862 C1).

In one embodiment, it is provided that the evaluation result is used for checking the plausibility of the crankshaft signal output by the crankshaft sensor and/or of the camshaft signal output by the camshaft sensor. It is thus possible, for example, for the situation of an erroneous (defective) generation of the crankshaft signal and/or of the camshaft signal to be diagnosed and stored for example as a fault entry in a diagnostic memory such as is conventional in motor vehicles. The plausibility check may alternatively or additionally also be used for diagnosing any assembly errors, for example incorrectly assembled camshaft drives such as toothed belts or chains.

Alternatively or in addition, the mentioned plausibility check of the crankshaft and/or camshaft signal may be used for further purposes.

For example, in one refinement, it is provided that the result of the evaluation of the cylinder pressure signal with regard to interference signals is used, in the event of the detection of an implausible crankshaft signal, as a replacement for said crankshaft signal or for correcting said crankshaft signal and/or, in the event of the detection of an implausible camshaft signal, as a replacement for said camshaft signal or for correcting said camshaft signal.

In particular, the evaluation result can thus also be used for rotational speed calculation and/or for realizing emergency running in the case of a defective crankshaft sensor or in the event of a defect in the area of the provision of the crankshaft signal (to the control unit). The same applies for the situation of a defective camshaft sensor or an erroneous provision of the camshaft signal.

A further possibility of interest consists in taking the evaluation result into consideration for the identification and then optionally also adaptation of deviations in the valve drive or the valve drive adjustment device as a result of component tolerances and/or aging. Component tolerances and/or aging can result in particular in a deviation of the design-intended times and/or angles for valve opening processes and valve closing processes. In this case, the information gained only on the basis of the camshaft signal and/or of a position sensor signal of the valve drive adjustment device would be inaccurate as regards the times and/or angles of the actual opening and closing processes. Since the actual opening and/or closing processes of the valves can however be detected by means of the evaluation of the cylinder pressure signal with regard to disturbance signals, the evaluation result constitutes an information source, which is extremely valuable in practice, for the engine control and in particular the control of the valve drive adjustment device.

By virtue of the consideration (or joint consideration in addition to a position sensor signal, crankshaft signal and/or camshaft signal) of the result of the evaluation of the cylinder pressure signal with regard to the interference signals, the cylinder pressure signal provides additional benefit for a precise actuation of valve drive adjustment devices such as for example camshaft adjustment systems (for example "phase converters"). It is advantageously possible for the evaluation result gained on the basis of the cylinder pressure signal to be utilized in particular for position setting and/or regulation of a control element of the valve drive adjustment device. The evaluation result yields precise times of the relevant processes in the valve drive, which times can serve as valuable current information for a controller or regulator which is otherwise constructed in a conventional manner.

A control unit used for controlling the internal combustion engine may be provided in the conventional manner as an electronic, in particular program-controlled control unit (for example microcontroller). However, the control unit may be further developed (for example by means of a corresponding modification of the control software) such that a control method of the type described above is carried out.

Figure 1:
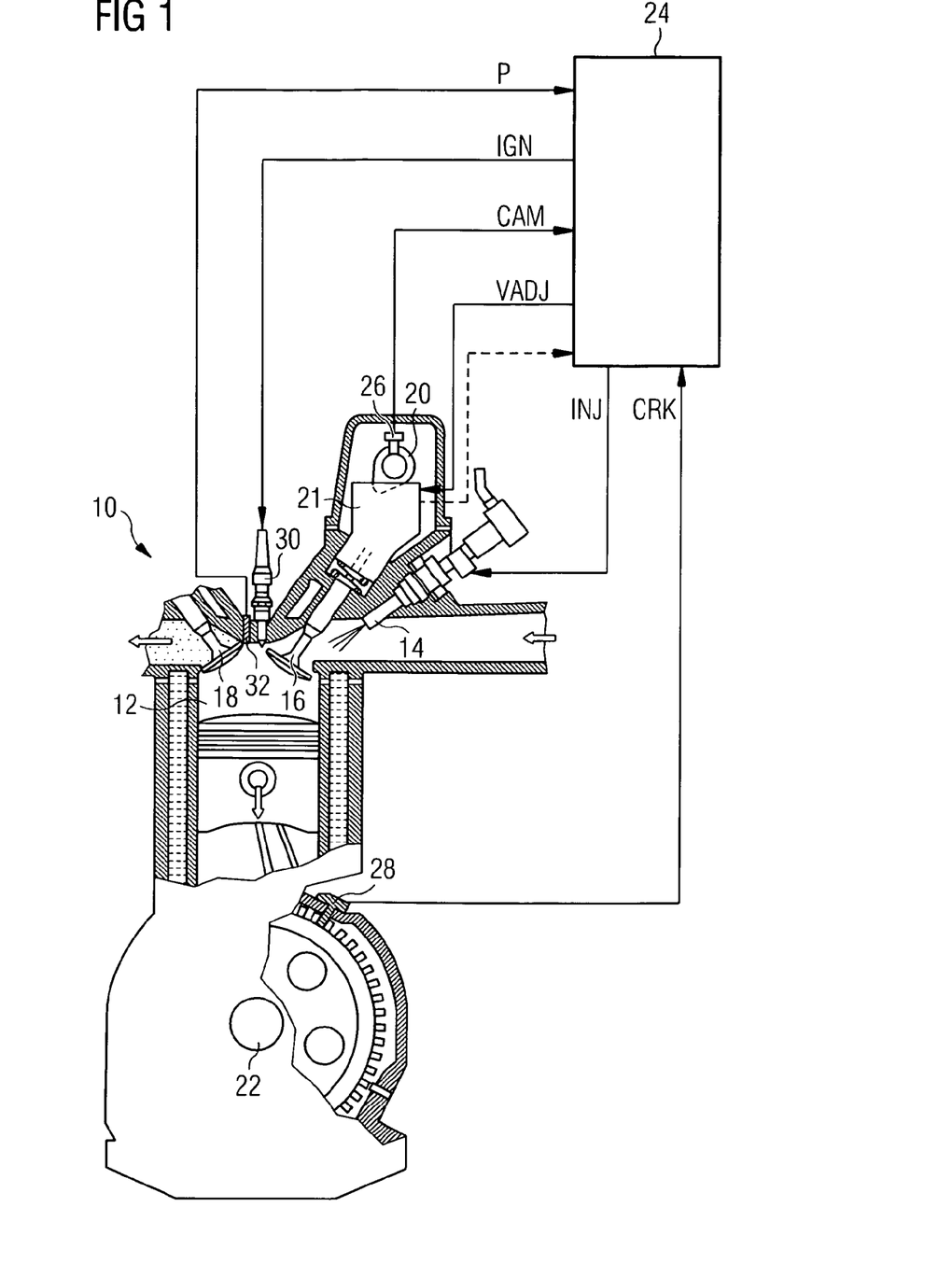
FIG. 1 shows a schematic sectional illustration of an internal combustion engine in the form of a 4-stroke applied-ignition engine.

FIG. 1 illustrates an internal combustion engine 10 which, in this case, is for example a four-cylinder 4-stroke applied-ignition engine.

Each cylinder 12 is assigned at least one injection valve or fuel injector 14 for injecting fuel (in this case gasoline) into an inlet-side intake pipe of the internal combustion engine 10.

Furthermore, each cylinder 12 is assigned in each case at least one inlet valve 16 and at least one outlet valve 18 and also at least one camshaft for actuating the inlet and outlet valves. In the exemplary embodiment illustrated, a camshaft 20 is provided for actuating the inlet valves 16 and a further camshaft (not illustrated) is provided for actuating the outlet valves 18.

In a manner known per se, there is a rotationally coupled connection between the camshafts and a crankshaft 22, said rotationally coupled connection being realized for example by means of a timing chain or the like and ensuring that, during operation of the internal combustion engine 10, the camshafts rotate at half of the rotational speed of the crankshaft 22, in order thereby to realize a working cycle or a gas exchange as per the 4-stroke cycle.

Into an electronic control unit 24 there are input inter alia a camshaft signal CAM which is dependent on the rotational position of the camshaft 20 and a crankshaft signal CRK which is dependent on the rotational position of the crankshaft 22. Said signals CAM and CRK are generated by means of suitable sensors, in this case a camshaft sensor 26 and a crankshaft sensor 28.

In a manner known per se, the signals CAM and CRK are generated in each case as rectangular signals.

Each pulse of the crankshaft signal CRK corresponds to a tooth of an encoder wheel, wherein a double tooth space provides a synchronization pulse after in each case one full revolution (360°) of the crankshaft 22. There are typically for example 30 or 60 teeth (minus the teeth omitted at the "gap") arranged on the circumference of the encoder wheel.

The two different levels of the camshaft signal CAM correspond to two successive revolutions of the crankshaft 22.

With regard to said encodings of the rotational positions of the crankshaft 22 and of the camshaft 20, reference is hereby made for example to the German patent DE 100 56 862 C1, in which time profiles of such signals CRK and CAM which arise during engine operation are schematically illustrated and described in more detail.

During operation of the internal combustion engine 10, the electronic control unit 24 controls in particular the injection of fuel (injection times) into the cylinders 12 by means of the respectively associated fuel injector 14 (actuation signal INJ). Furthermore, the control unit 24 also controls other processes of the internal combustion engine 10, such as in this case in particular an applied ignition (ignition times) by means of an ignition plug 30 respectively assigned to each cylinder 12 (high-voltage pulse IGN).

A valve drive adjustment device 21 shown symbolically in FIG. 1 serves for controllably changing the actuation characteristic of the valve (in this case inlet valve 16) which is actuated by means of the camshaft 20.

It is duly the case in the illustrated exemplary embodiment, too, that there is a fixed angular assignment between the camshaft 20 and crankshaft 22 as a result of a rotationally conjoint coupling (whereby the camshaft 20 rotates at half of the rotational speed of the crankshaft 22).

The actuation of the inlet valve 16 is however realized not directly or indirectly by means of an invariable mechanism (for example simple rocker arm etc.) but rather, as illustrated in FIG. 1, by means of the valve drive adjustment device 21 which can be controlled by means of an adjustment signal VADJ output by the control unit 24. It is thereby possible for the actuation characteristic, that is to say in this case the relationship between the present rotational angle position of the camshaft 20 (camshaft angle) and present valve lift VLFT (cf. FIG. 4) of the valve 16, to be controlled (in particular regulated). In particular for regulation of the change of the actuation characteristic, it is necessary to obtain the most precise possible information regarding the present setting of the valve drive adjustment device 21. For this purpose, there could be provided for example a corresponding "position sensor" which, as symbolized in FIG. 1 by the dashed line, outputs a corresponding sensor signal to the control unit 24. It is pointed out already at this juncture that such a position sensor can be omitted from the illustrated internal combustion engine 10 because the present setting of the valve drive adjustment device 21 can, as described below, be determined in a different way.

Figure 4:
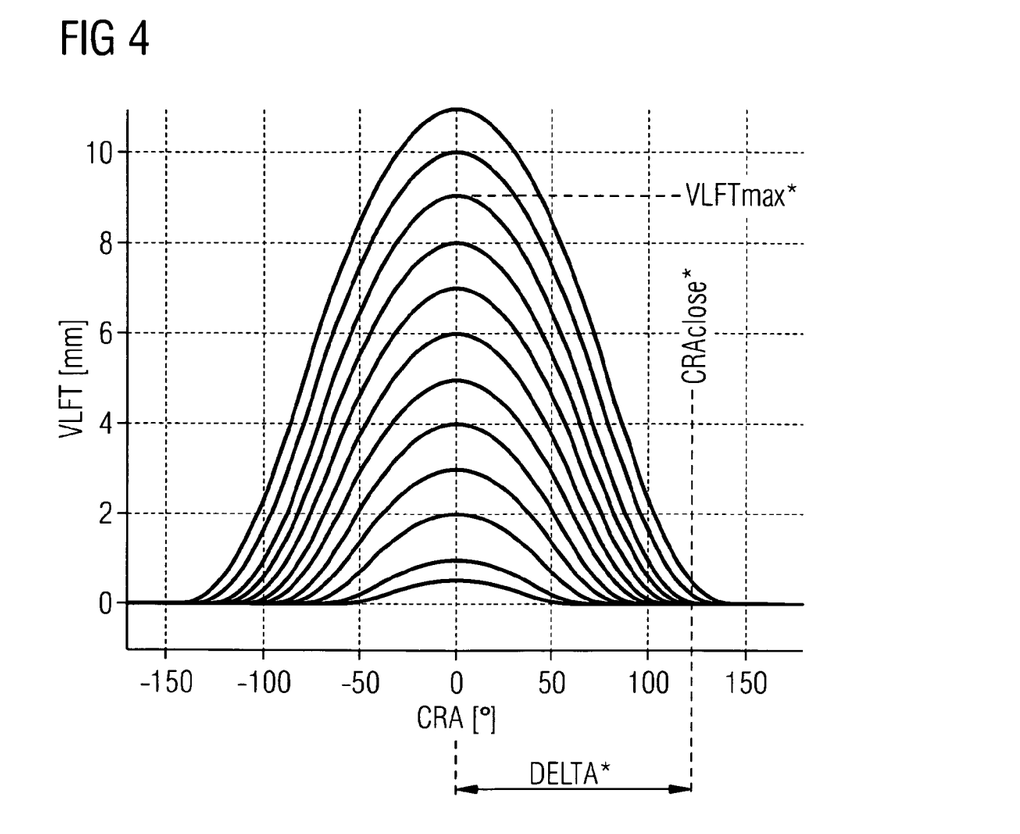
FIG. 4 shows an illustration of different lift curves of a valve as a function of the crank angle and the present setting of a valve drive adjustment device in the engine of FIG. 1.

It is the purpose of the change of the valve actuation characteristic to vary the valve timing (for example in order to vary the so-called valve overlap) as a function of one or more operating parameters of the respective engine (load, rotational speed, etc.) and/or to vary the (maximum) valve lift as a function of such operating parameters. FIG. 4 illustrates a change of the actuation characteristic wherein both the valve timing and also the valve lift are varied.

By means of the adjustment signal VADJ generated by the control unit 24 in accordance with an algorithm for controlling the device 21, it is for example possible for this purpose for an electromechanical or electrohydraulic actuator, which as a control element for changing the actuation characteristic is arranged in the valve drive adjustment device 21, to be actuated.

The change in the actuation characteristic (in this case for the inlet valve 16) may take place in a stepped or continuously variable manner.

Here, the change of the actuation characteristic may provide a valve (maximum) lift adjustment and/or a change of the valve timing. The latter could also be realized, by contrast to the exemplary embodiment illustrated in FIG. 1, by means of a so-called "phase converter" by means of which a rotation of the respective camshaft (in this case camshaft 20) relative to the crankshaft (and/or relative to a further camshaft) is effected for example in a load-dependent and/or rotational-speed-dependent manner. Such adjustment systems are the most widely used variable valve controllers in series use in motor vehicle engines. In the case of such special adjustment devices (phase converters), the cam profiles themselves and therefore the maximum valve lift and the valve opening duration usually remain unchanged.

In particular in the case of a continuous change of the actuation characteristic, it is typically the case in the prior art that the sensor signals of a camshaft sensor, of a crankshaft sensor and of a position sensor on the respective valve drive adjustment device are taken into consideration as an input variable in the control of the change of the actuation characteristic.

This is associated with a corresponding amount of outlay in terms of construction for the provision of the position sensor signal, in particular if said signal is intended to represent the present position of the valve drive adjustment device with high accuracy. In practice, said problem is intensified for example by tolerances which gradually arise or increase over the course of time.

Said problem is solved in the case of the illustrated internal combustion engine 10 in that each of the cylinders 12 is assigned a cylinder pressure sensor 32 which outputs to the control unit 24 a cylinder pressure signal P (cf. FIG. 2) which represents the present cylinder pressure. By means of the engine control software which is executed in the control unit 24, the cylinder pressure signal P is taken into consideration for the evaluation of the combustion in the cylinders 12, and based thereon, for the metering of the fuel, of the air mass or of a combustion gas fraction to be recirculated. For the solution of the problem explained above, however, it is crucial that the control unit 24 also performs an evaluation of the cylinder pressure signal P with regard to interference signals contained therein, and that the result of said evaluation is taken into consideration as an input variable in the control of the valve drive adjustment device 21. As explained below, said interference signals allow conclusions to be drawn regarding the positions of the valves and thus also for example regarding the present setting of the valve drive adjustment device 21.

Each cylinder pressure sensor 32 may advantageously be constructed, and function, in accordance with any known pressure measurement principles. Although the sensor signal P output thereby is determined primarily by the pressure prevailing in the respective cylinder 12, influencing of the sensor signal P occurs in practice, in effect as an artifact of the pressure measurement, as a result of noises or by body-borne sound which is transmitted to the cylinder pressure sensors. Such noises are caused in principle for example by all of the mechanical processes in the valve drive. Among the interference signals thus generated, it is again the case in particular that the dominant ones are those caused by the termination of a valve closing process. In the exemplary embodiment illustrated, for example, the setting-down of the valve plate of the inlet valve 16 on the valve sealing region of the engine block leads to a corresponding (characteristic) interference signal in the cylinder pressure signal P.

By means of the evaluation of the cylinder pressure signal P, it is thus possible to very accurately detect the time (and/or crank angle) at which the inlet valve 16 closes. In principle, and by contrast to the exemplary embodiment illustrated, it is conceivable for use to be made of less than one cylinder pressure sensor per cylinder 12. In particular because each valve of the internal combustion engine 10 has a different spatial relationship (for example spacing) with respect to a cylinder pressure sensor, it is possible on the basis of predetermined evaluation criteria to realize an assignment of a certain interference signal to a certain valve. It is better, and simpler with regard to evaluation outlay, if, as is also provided in the exemplary embodiment, in each case one cylinder sensor 32 is provided per cylinder 12 (on a wall delimiting the latter, for example in the cylinder head).

A simplification of the distinction of interference signals caused by the different valves of one and the same cylinder 12 can be realized for example by virtue of the respective cylinder pressure sensor 32 being arranged not "in the middle" between the valves but rather for example with clearly different "acoustic spacings" to the individual valves. In this case, it is the case in particular that the amplitudes of the interference signals will differ according to which of the valves the respective acoustic interference noise originated from.

By contrast to the exemplary embodiment illustrated in FIG. 1, the internal combustion engine 10 could also have only a single cylinder 12. Such single-cylinder internal combustion engines are often used for example in motorcycles. In the case of a single-cylinder internal combustion engine, too, it is possible by means of the disclosed techniques to realize the determination of a signal which is expedient for the control of the valve drive adjustment device.

One possibility for the realization of the evaluation of the cylinder pressure signal P will be explained in more detail below on the basis of FIGS. 2 and 3.

Figure 2:
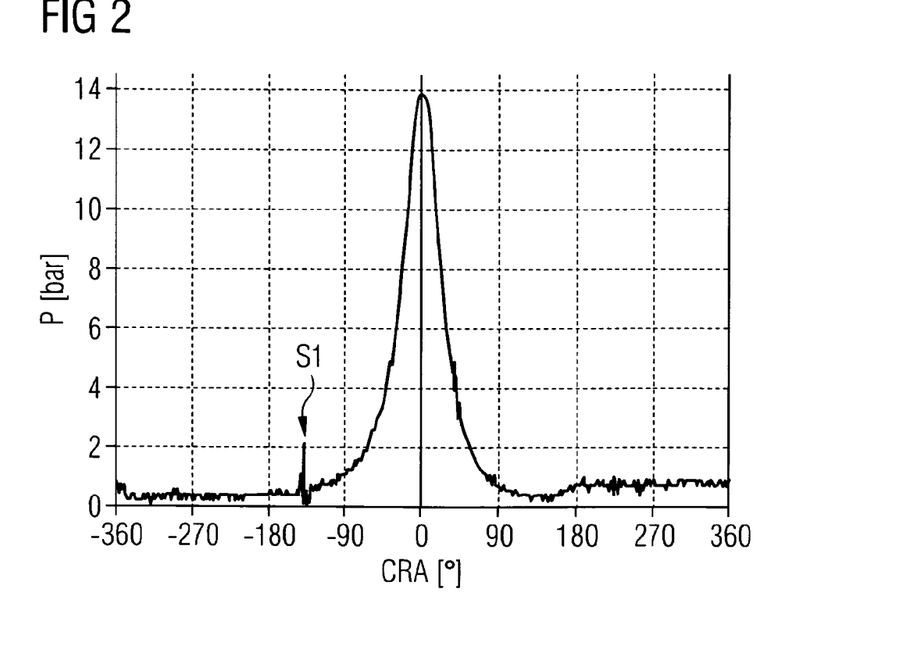
FIG. 2 shows an illustration of a cylinder pressure signal profile as a function of the crank angle in the engine of FIG. 1.

FIG. 2 shows an exemplary profile of a cylinder pressure signal P, measured in the internal combustion engine 10 by means of a cylinder pressure sensor 16, as a function of the crank(shaft) angle CRA. In this illustration, the value of CRA=0° corresponds to top dead center of the piston movement in the cylinder 12. The profile of the signal P is illustrated here for the situation of externally driven operation of the internal combustion engine 10. A similar signal profile is however also obtained in overrun operation.

Clearly visible in FIG. 2 is an interference signal S1 superposed on the actual cylinder pressure profile at a crank angle CRA of approximately −140°, which interference signal, in the example illustrated, can be assigned to the closing of the inlet valve 16.

In one embodiment of the evaluation of the cylinder pressure signal P with regard to such interference components, the cylinder pressure signal P is firstly high-pass filtered.

Figure 3:
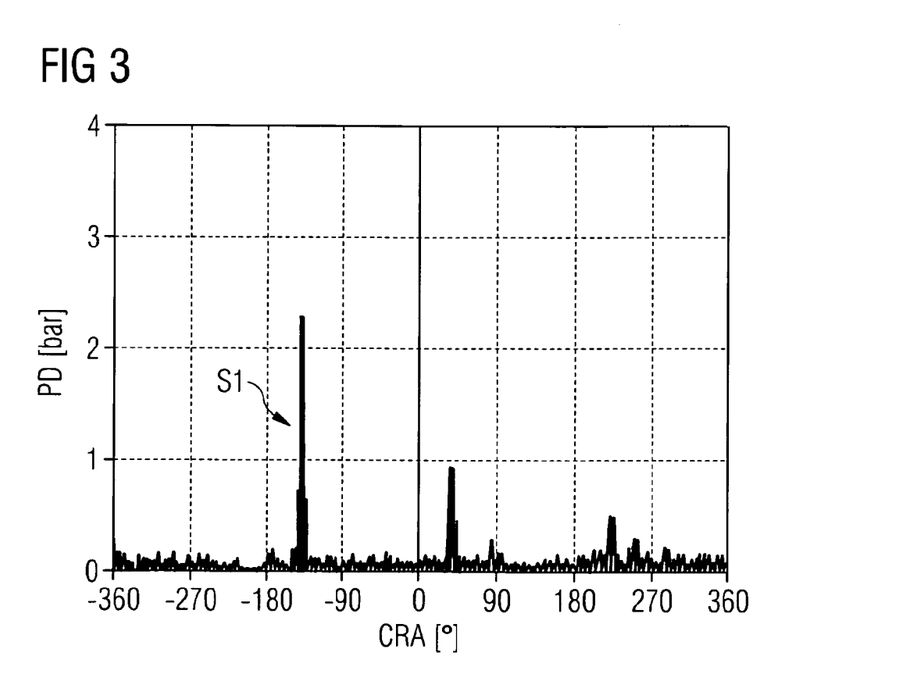
FIG. 3 shows a plot of the high-pass-filtered cylinder pressure signal versus the crank angle.

FIG. 3 shows the result of a high-pass filtering of the cylinder pressure signal P from FIG. 2. The high-pass filtered signal PD is composed, as can be seen in FIG. 3, virtually exclusively of the interference signals, such that in a subsequent evaluation stage, the individual interference signals can be more easily detected and assigned to the relevant processes in the valve drive.

In particular after such high-pass filtering, it is possible in a simple manner to carry out an evaluation with regard to those interference signals which have been generated by the inlet valves and/or outlet valves during the actuation thereof.

As shown in FIG. 3, it is thus possible already by means of a simple high-pass filter and the determination of interference pulses (for example on the basis of the exceedance of a predetermined threshold) to determine a "valve closes" signal from the actual cylinder pressure signal P. Alternatively or in addition to a check of the filtered signal with regard to the exceedance of one or more predetermined thresholds, it would for example be possible to carry out a pattern comparison between the actually detected signal pattern and previously stored signal patterns assigned to respective valve drive processes. Such a pattern comparison may however be carried out only for an "interference signal profile" which has previously already been identified as such. As already mentioned, the start of such an interference signal profile may be established for example by detection of a sudden or abnormal change in the cylinder pressure signal P. The signal profile generated subsequently thereto can, for the purpose of identifying the triggering event, be compared with previously stored signal patterns in order to assign the interference to a certain valve drive process. Such an approach, in which a pattern comparison is carried out at most for the interference signal itself and not for a longer-lasting signal profile provides a useful evaluation result particularly quickly.

In the exemplary embodiment illustrated, said evaluation result thus provides the time and/or crank angle CRA at which the inlet valve 16 closes.

It will be explained below with reference to FIG. 4 how, by means of the software executed in the control unit 24, the present setting of the valve drive adjustment device 21 is inferred from said "valve closes" information.

FIG. 4 shows, by way of example, twelve different "lift curves", that is to say profiles of the present valve lift VLFT as a function of the crank angle CRA. As illustrated, in this plot, the different lift curves form a set of non-intersecting profiles.

In the case of a continuous change of the actuation characteristic illustrated in FIG. 4, it is theoretically possible to obtain an infinite number of different lift curves. The twelve profiles illustrated by way of example in FIG. 4 are intended merely to illustrate a special feature of the adjustability used here, which consists in that every adjustment of the valve drive adjustment device 21 leads in particular to a change of the time and/or crank angle CRA at which the respective valve (inlet valve 16) closes. In other words, based on the information regarding the closing time, it is possible to infer the entire lift curve profile and the present setting of the valve drive adjustment device 21.

For example, let it be assumed that said present setting provides a lift curve whose maximum is denoted in FIG. 4 by VLFTmax* and whose end in terms of crank angle is denoted in FIG. 4 by CRAclose*. Based on the camshaft signal CAM (in conjunction with the crankshaft signal CRK), the control unit 24 can determine the angular position of the lift maximum (plotted at 0° in FIG. 4). In combination with the time or crank angle CRAclose*, it is possible to calculate the angle interval, denoted in FIG. 4 by DELTA*, between the lift maximum and the valve closing time. In the illustrated exemplary embodiment, said interval constitutes half of the valve opening duration and can be uniquely assigned to the lift maximum VLFTmax* and to the associated lift curve. In the engine controller, said assignment may be performed very generally by means of a suitable software algorithm and/or through the use of a previously stored characteristic map.

In said example, the result of the evaluation of the cylinder pressure signal P is initially the time and/or crank angle (CRAclose*) at which the inlet valve 16 closes. The time (and/or a time period such as DELTA* derived therefrom) determined in this specific way is fed, as an input variable, to that part of the engine control software, executed in the control unit 24, which as an output variable generates the adjustment signal VADJ for the valve drive adjustment device 21.

Said generation is based on a calculation in which the output variable is dependent on the input variable.

It is thus possible, by means of the disclosed evaluation of the cylinder pressure signal with regard to the interference signals characteristic of the valve actuation processes, to construct in particular a valve lift regulation facility wherein a position sensor provided specifically for detecting the present setting of the valve drive adjustment device 21 can be dispensed with and/or (for example aging-induced) deviations of the position sensor signal can be advantageously adapted.

In summary, in the internal combustion 10, the sensitivity of the cylinder pressure sensor 32 to interference noises is utilized to initially derive therefrom information regarding the present position of at least one valve and (by means of possible further evaluation in the region of the control unit 24) to provide valuable information (for example CRAclose* and/or DELTA*) for the control of the valve drive adjustment device 21.

If, for example, the internal combustion engine 10 is equipped with a variable valve controller (valve drive adjustment device) in the form of a so-called "phase converter", this entails an assignment between the camshaft angle and valve actuation which is no longer unique and/or dependent on the state of the respective adjustment device. With the use of times such as "valve closes" which are determined from the cylinder pressure signal P, real physical feedback regarding the position of the valve is provided to the control unit 24 at all times. Said information can thus advantageously be utilized in the actuation (in particular regulation) of the corresponding adjustment system.

Furthermore, said information can for example be used in order to detect and/or adapt faults and/or deviations of camshaft position sensors (of the variable valve controller).

Even operation of the engine without a camshaft sensor is possible (by virtue of the result of the cylinder pressure signal P being taken into consideration instead). Furthermore, emergency running of the engine is possible in the event of a defect of the crankshaft sensor and/or of the camshaft sensor.

If, during the assembly of the engine 10, the assignment in terms of rotational angle between the camshaft 20 and crankshaft 22 in the basic position is not carried out correctly, for example during an exchange of a camshaft toothed belt in a motor vehicle workshop, the engine controller 24 has false information regarding the position of the camshaft 22. This would normally have the result that the parameters for the combustion cannot be correctly set by the engine control unit 24, which can lead to increased emissions, poor engine running, and in the extreme case even to engine damage. A similar problem arises in the event of deviations resulting from production tolerances, aging etc. Such assembly errors and also deviations from the setpoint position or configuration which arise only later during operation can however advantageously be detected and taken into consideration by means of the evaluation of the cylinder pressure signal P.

What is claimed is:

1. A method for controlling a single-cylinder or multi-cylinder internal combustion engine having at least one fuel injector per cylinder for injecting fuel, at least one camshaft for actuating at least one inlet valve and/or at least one outlet valve, wherein a valve drive adjustment device is provided for controllable change of the actuation characteristic of at least one valve that is actuated by means of the camshaft, a crankshaft sensor which outputs a crankshaft signal which represents the crankshaft angle, and a control unit for controlling the fuel injection and the valve drive adjustment device, the method comprising:
   the control unit receiving at least one cylinder pressure signal from a cylinder pressure sensor for measuring the pressure in an associated cylinder,
   the control unit evaluating the at least one cylinder pressure signal with regard to interference signals, and
   the control unit controlling the valve drive adjustment device based at least on the evaluation result of the at least one cylinder pressure signal,
   wherein the control unit further receives a camshaft signal output by a camshaft sensor,
   wherein the control unit further evaluates the at least one cylinder pressure signal and the camshaft signal to determine a present setting of the valve drive adjustment device by setting a certain event of a valve actuation process relative to a time or crank angle.

2. The method of claim 1, wherein the change of the actuation characteristic of the respective valve encompasses a valve lift adjustment and the evaluation result is taken into consideration as an input variable in the control of the valve lift adjustment.

3. The method of claim 1, wherein the change of the actuation characteristic of the respective valve encompasses a camshaft phase adjustment and the evaluation result is taken into consideration as an input variable in the control of the camshaft phase adjustment.

4. The method of claim 1, wherein the change of the actuation characteristic of the respective valve takes place in continuous manner.

5. The method of claim 1, wherein the evaluation result is further used for checking a plausibility of at least one of the crankshaft signal output by the crankshaft sensor and the camshaft signal output by the camshaft sensor.

6. The method of claim 1, wherein the internal combustion engine has a plurality of cylinders and the cylinder pressure signals of cylinder pressure sensors respectively assigned to all of the cylinders are taken into consideration.

7. A control unit for controlling a single-cylinder or multi-cylinder internal combustion engine having at least one fuel injector per cylinder for injecting fuel, at least one camshaft for actuating at least one inlet valve and/or at least one outlet valve, wherein a valve drive adjustment device is provided for controllable change of the actuation characteristic of at least one valve that is actuated by means of the camshaft, a crankshaft sensor which outputs a crankshaft signal which represents the crankshaft angle, and     wherein the control unit is configured to control the fuel injection and the valve drive adjustment device, wherein controlling the valve drive adjustment device comprises:

receiving at least one cylinder pressure signal from a cylinder pressure sensor for measuring the pressure in an associated cylinder,         evaluating the at least one cylinder pressure signal with regard to interference signals, and         controlling the valve drive adjustment device based at least on the evaluation result of the at least one cylinder pressure signal,     wherein the control unit further receives a camshaft signal output by a camshaft sensor,     wherein the control unit further evaluates the at least one cylinder pressure signal and the camshaft signal to determine a present setting of the valve drive adjustment device by setting a certain event of a valve actuation process relative to a time or crank angle.

8. The control unit of claim 7, wherein the change of the actuation characteristic of the respective valve encompasses a valve lift adjustment and the evaluation result is taken into consideration as an input variable in the control of the valve lift adjustment.

9. The control unit of claim 7, wherein the change of the actuation characteristic of the respective valve encompasses a camshaft phase adjustment and the evaluation result is taken into consideration as an input variable in the control of the camshaft phase adjustment.

10. The control unit of claim 7, wherein the change of the actuation characteristic of the respective valve takes place in continuous manner.

11. The control unit of claim 7, wherein the evaluation result is further used for checking a plausibility of at least one of the crankshaft signal output by the crankshaft sensor and the camshaft signal output by the camshaft sensor.

12. The control unit of claim 7, wherein the internal combustion engine has a plurality of cylinders and the cylinder pressure signals of cylinder pressure sensors respectively assigned to all of the cylinders are taken into consideration.

13. An internal combustion engine, comprising:
at least one fuel injector per cylinder for injecting fuel,
at least one camshaft for actuating at least one inlet valve and/or at least one outlet valve,
a valve drive adjustment device for controllable switching between at least two different actuation characteristics of at least one valve actuated by the camshaft, and
a crankshaft sensor which outputs a crankshaft signal which represents the crankshaft angle, and
a control unit configured to control the fuel injection and the valve drive adjustment device, wherein controlling the valve drive adjustment device comprises:

the control unit receiving at least one cylinder pressure signal from a cylinder pressure sensor for measuring the pressure in an associated cylinder,     the control unit evaluating the at least one cylinder pressure signal with regard to interference signals, and     the control unit controlling the valve drive adjustment device based at least on the result of the evaluation of the at least one cylinder pressure signal, wherein the control unit further receives a camshaft signal output by a camshaft sensor, wherein the control unit further evaluates the at least one cylinder pressure signal and the camshaft signal to determine a present setting of the valve drive adjustment device by setting a certain event of a valve actuation process relative to a time or crank angle.

14. The internal combustion engine of claim 13, wherein the change of the actuation characteristic of the respective valve encompasses a valve lift adjustment and the evaluation result is taken into consideration as an input variable in the control of the valve lift adjustment.

15. The internal combustion engine of claim 13, wherein the change of the actuation characteristic of the respective valve encompasses a camshaft phase adjustment and the evaluation result is taken into consideration as an input variable in the control of the camshaft phase adjustment.

16. The internal combustion engine of claim 13, wherein the change of the actuation characteristic of the respective valve takes place in continuous manner.

17. The internal combustion engine of claim 13, wherein the evaluation result is further used for checking a plausibility of at least one of the crankshaft signal output by the crankshaft sensor and the camshaft signal output by the camshaft sensor.

\* \* \* \* \*